United States Patent [19]
Littleproud et al.

[11] Patent Number: 5,072,950
[45] Date of Patent: Dec. 17, 1991

[54] VALVE STEM ASSEMBLY

[75] Inventors: Antony Littleproud, Mid Glamorgan; David Hill, South Glamorgan, both of Wales

[73] Assignee: Seal Technology Systems, Cardiff, Wales

[21] Appl. No.: 573,567

[22] Filed: Aug. 24, 1990

[30] Foreign Application Priority Data

Aug. 25, 1989 [GB] United Kingdom ............... 8919398

[51] Int. Cl.5 .................... F16J 15/32; F01L 3/08; B23P 19/04
[52] U.S. Cl. .................................. 277/9.5; 277/9; 29/213.1; 29/215; 123/188 SA; 123/188 SB
[58] Field of Search ............... 277/33, 9, 9.5; 29/213.1, 214, 215, 216, 278, 281.1; 81/488; 123/188 SA, 188 SB

[56] References Cited

U.S. PATENT DOCUMENTS

| | | | |
|---|---|---|---|
| 1,488,365 | 3/1924 | Stoakes | 29/213.1 |
| 2,434,456 | 1/1948 | Cook | 29/215 |
| 3,369,819 | 2/1968 | Soo | 277/33 X |
| 3,490,428 | 1/1970 | Updike et al. | 277/33 |
| 4,432,311 | 2/1984 | Holtzberg et al. | 123/188 SB X |
| 4,826,180 | 5/1989 | Deuring | 277/9.5 |
| 4,919,090 | 4/1990 | Deuring et al. | 123/90.67 |

FOREIGN PATENT DOCUMENTS

| | | | |
|---|---|---|---|
| 0341480 | 4/1989 | European Pat. Off. | |
| 3711436 | 7/1988 | Fed. Rep. of Germany | |
| 177936 | 7/1989 | Japan | 29/213.1 |
| 467820 | 5/1975 | U.S.S.R. | 29/214 |
| 179111 | 4/1922 | United Kingdom | |
| 283263 | 1/1928 | United Kingdom | 29/215 |
| 317580 | 8/1929 | United Kingdom | |
| 319188 | 9/1929 | United Kingdom | |
| 976160 | 11/1964 | United Kingdom | 29/213.1 |
| 1500874 | 2/1978 | United Kingdom | 29/214 |
| 2046161 | 11/1980 | United Kingdom | 29/213.1 |
| WO88/04357 | 6/1988 | World Int. Prop. O. | |

Primary Examiner—William A. Cuchlinski, Jr.
Assistant Examiner—J. Folker
Attorney, Agent, or Firm—Frishauf, Holtz, Goodman & Woodward

[57] ABSTRACT

A valve stem seal assembly comprises a valve stem seal having an external flange and a sealing lip, a washer having a tapered axial bore therein, a spring extending between the external flange of the seal and the washer, and a member engaging the seal and the washer and holding the seal, spring and washer together. The member has a lower tubular portion, an intermediate conical portion engaged by the sealing lip of the valve stem seal, and flexible fingers at the upper end of the member which are in engagement with the tapered axial bore in the washer.

3 Claims, 4 Drawing Sheets

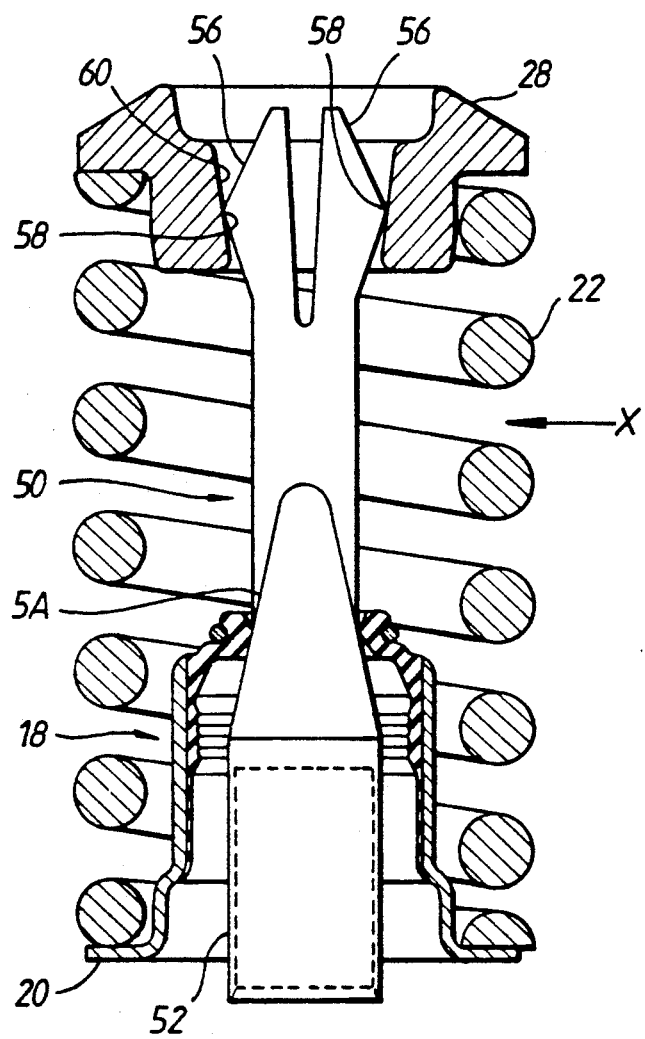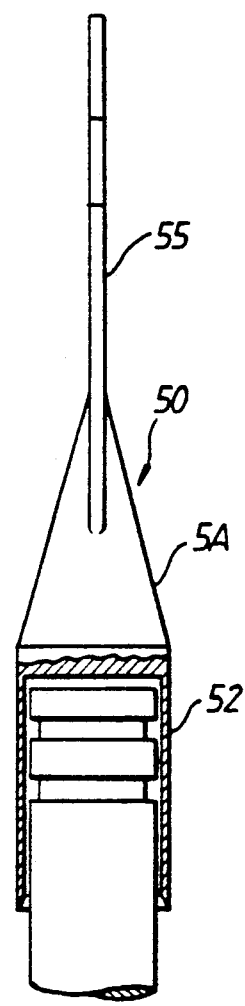
Fig.4.
Fig.5.

VALVE STEM ASSEMBLY

This invention is concerned with the stem seal and bias spring assembly mounted at the outer end of the stem of a valve in an internal combustion engine.

As seen in FIG. 3 of the accompanying drawings the stem 10 of the valve 12 of an internal combustion engine extends through a bushing 14 in the engine casing 16. At the top of the bushing 14 is mounted a seal 18 having an external flange 20 seated on the outer surface of the casing. A bias spring 22 (in this case a pair of concentric springs) extends between the flange 20 and the external flange 26 of the washer 28 which is secured in place by means of a tapered internal skirt 30 engaged by the tapered external surface of normally a pair of cotters 32 which are clipped into a groove 34 at the top of the valve stem.

The assembly as shown in FIG. 3 is entirely conventional, and the method of assembly involves normal selection of the component parts from storage bins in a particular sequence followed by the actual assembly of the individual parts.

This however is a time consuming operation which requires considerable operator skill and logistical problems in providing multiple storage bins on the assembly line and keeping the bins appropriately stocked.

It is an object of the present invention to obviate or mitigate these problems.

The present invention is a valve stem seal assembly comprising a valve stem seal having an external flange, a washer, a spring extending between the flange on the seal and the washer and a member engaging the seal and the washer and holding the seal, spring and washer together.

Embodiments of the present invention will now be described, by way of example, with reference to the accompanying drawings in which:

FIG. 4 is a front sectional elevation of a second embodiment of the present invention; and FIG. 5 is a side view of part of the embodiment of FIG. 4.

Figure 1:
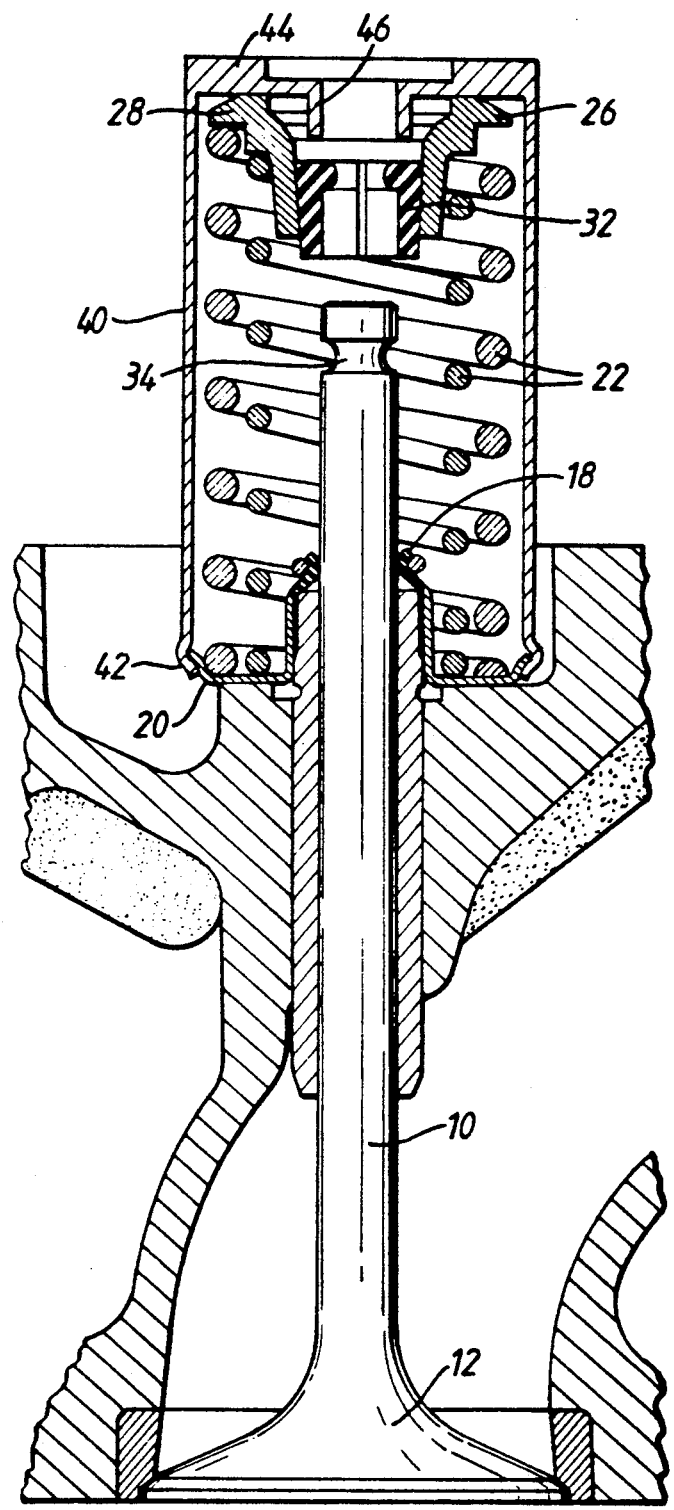
FIG. 1 is a sectional elevation of a component containing cassette according to the present invention, positioned around the stem of a valve.

As shown in FIG. 1, the seal 18, spring 22, washer 28 and cotters 32 are assembled in a flexible tubular container member 40 which consists of a thin wall extending from an internal lip 42 engaged by the flange 20 of the seal to an internal flange 44 engaged by the washer 28 and having an internal axially extending skirt 46.

The components are inserted in the container in the order cotters and washer, spring and seal. The length of the cassette is such that to engage the seal 18 behind the lip 42, the spring 22 must be compressed slightly. The cassette comprising the container with the components held together therein is a readily transportable item thus obviating the problem on the engine production line, the container being loaded with its components where convenient away from the production line.

Figure 2:
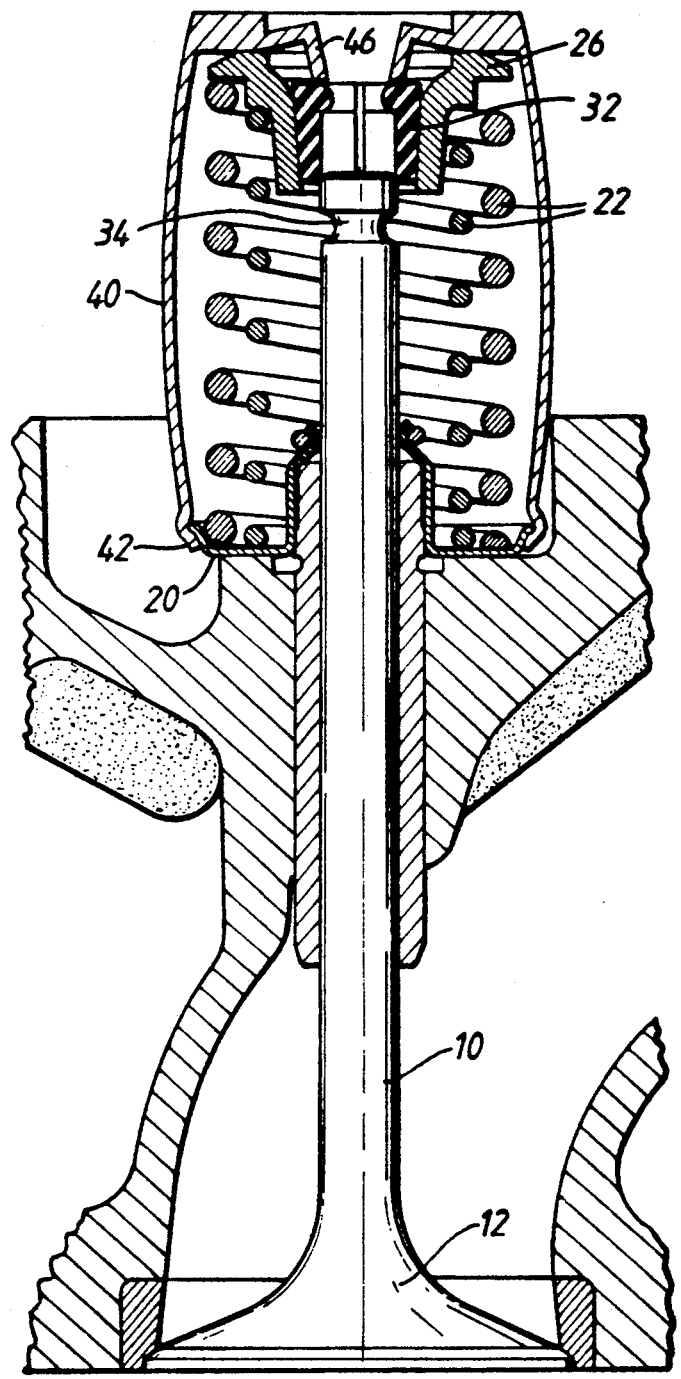
FIG. 2 is a view similar to FIG. 1 showing the next stage in assembling the components on the valve stem.
Figure 3:
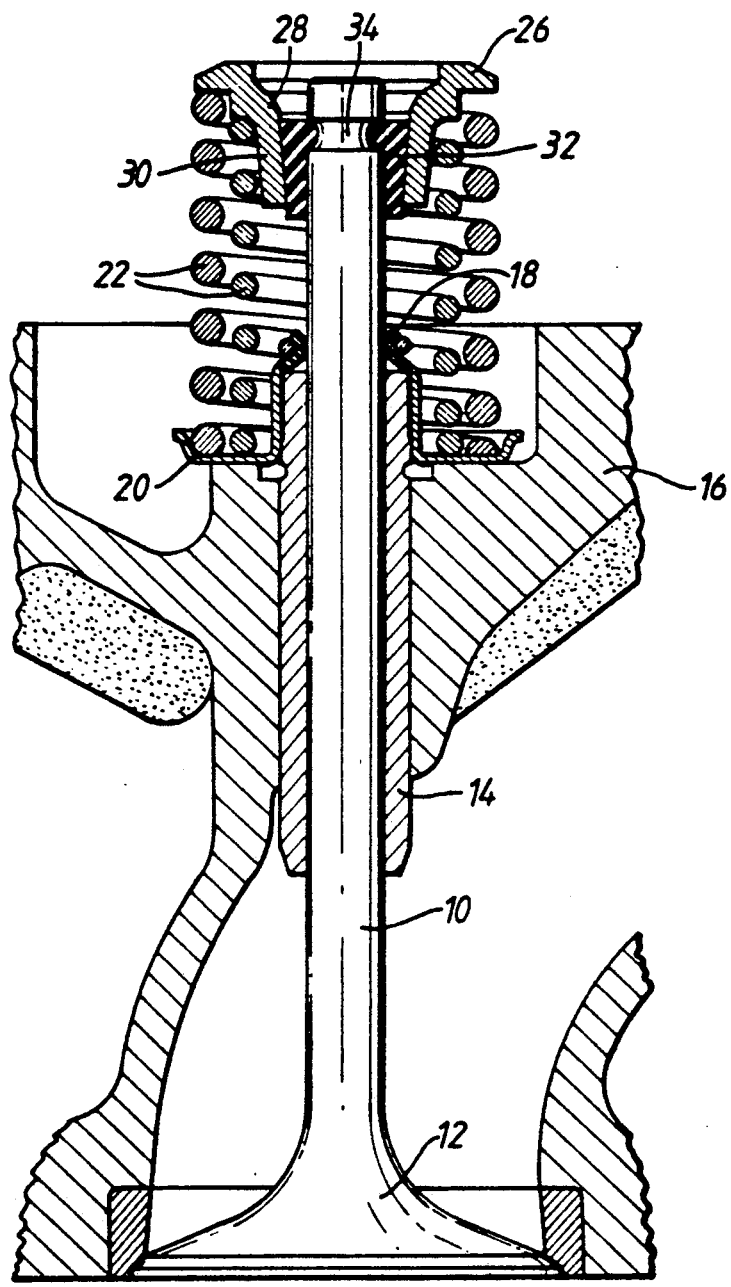
FIG. 3 is a view similar to FIGS. 1 and 2 showing the components assembled on the valve stem.

To assemble the components on the valve stem 10 the cassette is first located in the position shown in FIG. 1, the seal being slid down the valve stem. The next step is shown in FIG. 2, the cassette being compressed by a mounting tool against the bias of the spring 22 to engage the skirt 46 with the cotters and move the cotters down to the point where they snap into position in the groove 34 on the valve stem. The components are now properly assembled on the valve stem and the container can be removed by disengaging the lip 42 from the flange 20 and then discarded to leave the assembly shown in FIG. 3.

FIGS. 4 and 5 illustrate a second embodiment of the invention utilising in place of the container a central sleeve member 50 made in this embodiment of a plastics material. The sleeve 50 consists of a lower tubular portion 52, an intermediate conical portion 54 and an upper flat portion 55 terminating in a plurality of, in this embodiment two, flexible fingers 56 each provided with an external knuckle 58. To mount the seal 18, spring 22 and washer 28 on the sleeve 50, the seal 18 is first placed over the sleeve 50 so that the seal lip is located on the conical portion 54. The spring 22 is then placed in position on the outer flange 20 of the seal and the washer 28 is placed at the top of the spring and pressed down until the knuckles 58 on the fingers engage the inner tapered bore 60 of the washer 28, the fingers flexing inwardly to allow the knuckles to enter the bore. The seal, spring and washer are now held together by the sleeve 50.

On assembly on the valve stem 10, the tubular portion 52 of the sleeve is first located over the valve stem and the cotter groove pressure is applied by the mounting tool to the washer, this pressure causing the seal to move down until its external flange is properly seated on the engine casing, the seal lip then having passed down beyond the tubular portion and being engaged with the valve stem. The central sleeve 50 is then withdrawn upwardly, the cotters are placed in the tapered bore of the washer 28 and as the pressure on the washer is released, the washer moves up until the cotters snap into the cotter grooves.

This second embodiment has the advantage that the sealing lip is protected by the tubular portion 52 from damage by the cotter grooves as it passed down over the valve stem.

It can be seen from the above that for both embodiments the assembly operation on the engine production line is much quicker and simpler.

Seal assemblies of each of the two embodiments described may be secured together on a suitable jig to facilitate the loading of automatic machinery on an assembly line. Ideally the number of seal assemblies so secured would correspond to the number of valves in a cylinder head.

We claim:

1. A valve stem seal assembly comprising:
    a valve stem seal having an external flange and a sealing lip;
    a washer having a tapered axial bore;
    a spring extending between the external flange of the seal and the washer; and
    a member engaging the seal and the washer and holding the seal, spring and washer together;
    the member having a lower tubular portion, an intermediate conical portion engaged by the sealing lip of the valve stem seal, and flexible fingers at its upper end in engagement with the tapered axial bore in the washer.

2. The valve stem seal assembly of claim 1, wherein each flexible finger is provided with an outwardly projecting knuckle which engages the axial bore in the washer.

3. The valve stem seal assembly of claim 1, further comprising cotters mounted in the tapered axial bore of the washer and retained therein by the member.

* * * * *